Sept. 29, 1953
S. C. HETH
2,653,701
NONWINDING HEADER AUGER
Filed Aug. 9, 1950
2 Sheets-Sheet 1
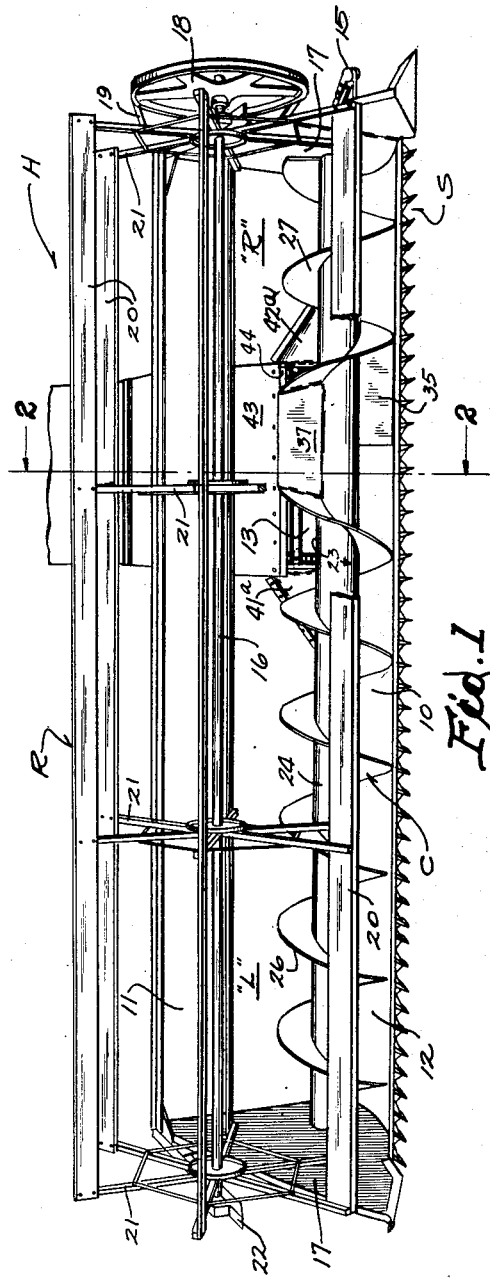
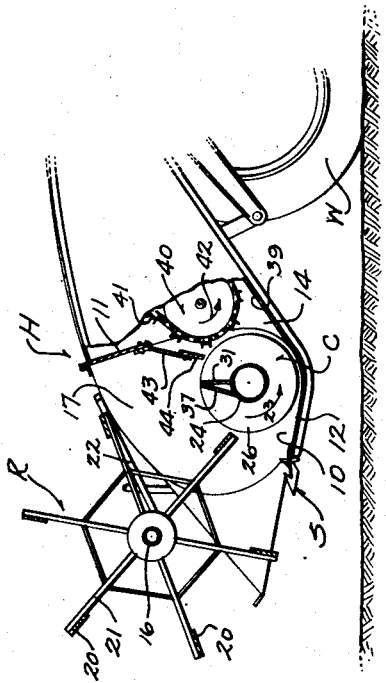
INVENTOR
SHERMAN C. HETH
BY
AGENT Sept. 29, 1953 S. C. HETH 2,653,701
NONWINDING HEADER AUGER
Filed Aug. 9, 1950 2 Sheets-Sheet 2
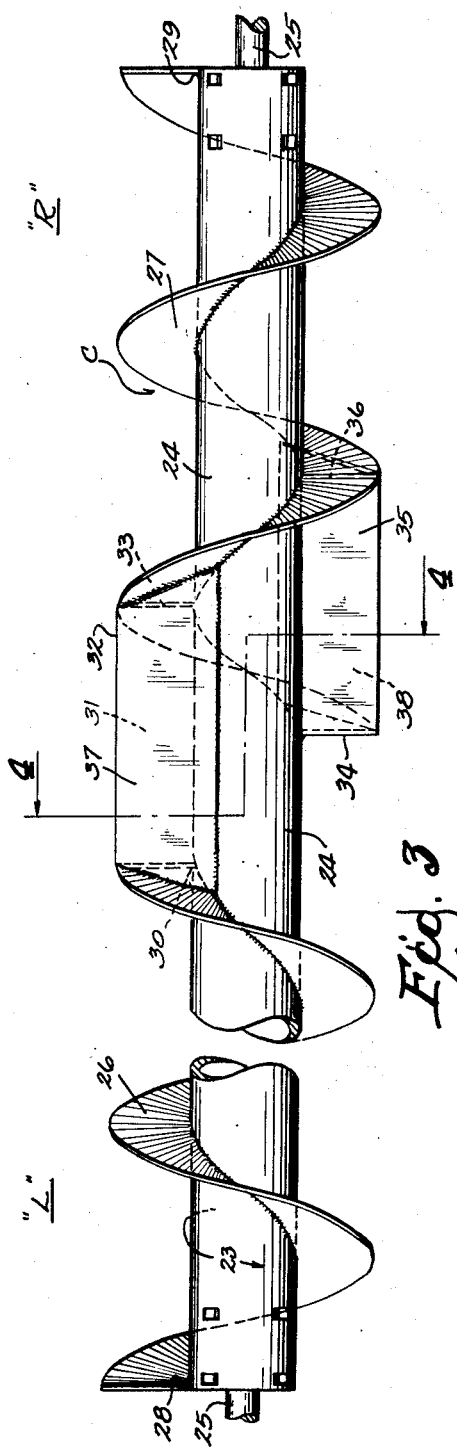
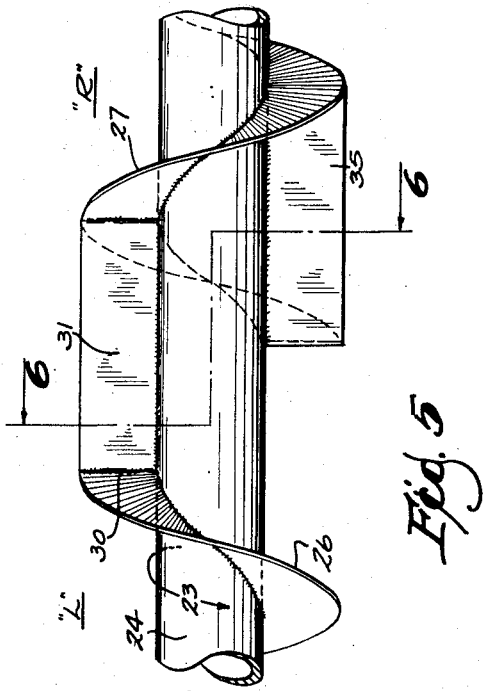
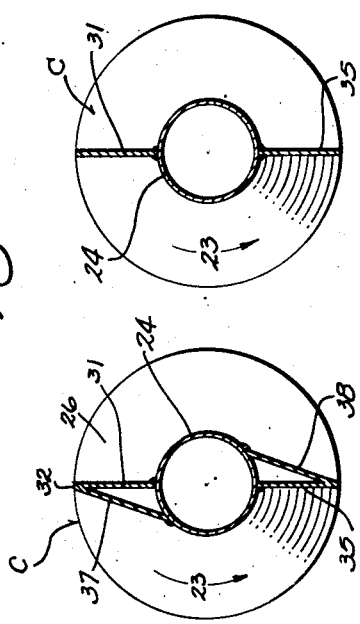
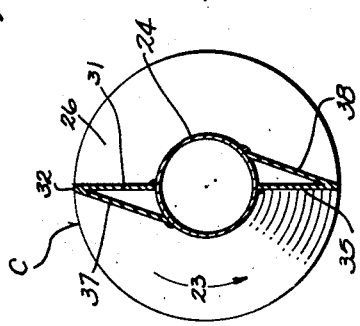
INVENTOR
SHERMAN C. HETH
BY
AGENT Patented Sept. 29, 1953

2,653,701

UNITED STATES PATENT OFFICE 2,653,701

NONWINDING HEADER AUGER

Sherman C. Heth, Racine, Wis., assignor to J. I. Case Company, Racine, Wis., a corporation of Wisconsin Application August 9, 1950, Serial No. 178,479

12 Claims. (Cl. 198—217)

This invention relates to improvements in combination harvester threshers, commonly called "combines," and specifically to improvements in the apparatus used to convey the cut grain or crop from the harvesting elements of the machine to the threshing or separating mechanism thereof.

In the type of machine under consideration, difficulty has been experienced in properly conveying the cut grain from the harvesting sickle to the rearwardly moving conveyor leading to the threshing elements of the machine, in that the grain layer has a tendency to vary in depth at the point at which it is transferred to the conveyor. It is necessary, in order to obtain satisfactory threshing, to distribute the grain evenly over the conveyor in order that it may reach the threshing elements in a layer of uniform depth.

The above mentioned difficulty is aggravated by the customary but necessary placing of the threshing elements near one end of the feed trough for purposes of convenience, resulting in an excess quantity of cut crop being conveyed from one end. When the cut crop reaches the thresher conveyor the latter gathers it rearwardly resulting in "starving" at the far side of the opening. It is therefore a primary object of this invention to provide an improved conveying mechanism which will convey the crop material cut by the sickle to the threshing conveyor in a continuous and uniformly-deep layer.

Another object is to obviate as much as possible the tendency for long tough "down" grain to wind about the core of the auger.

Another object is to provide an auger which will tend to force the grain or straw radially and clear the auger as quickly as possible.

Further objects and advantages of the invention will become apparent from the following detailed description taken in connection with the accompanying drawings wherein a satisfactory embodiment of the invention is shown. However, it is to be understood that the invention is not limited to the details disclosed but includes all such variations and modifications as fall within the spirit of the invention.

In the drawings:

Fig. 1 is a fragmentary front view of so much of a combine as is necessary to show the relation of the invention thereto;

Fig. 2 is a fragmentary section taken at 2—2 of Fig. 1;

Fig. 3 is an enlarged fragmentary view of a portion of the screw conveyor.

Fig. 4 is a section taken at 4—4 of Fig. 3;

Fig. 5 is a modification of the conveyor shown in Fig. 3 and Fig. 6 is a section taken at 6—6 of Fig. 5.

Referring to the drawings; H designates a header portion of a self-propelled combine, carrying a reel R, a sickle S for cutting the crop and a screw conveyor C. The above instrumentalities in this instance are carried by a conventional combine supported upon wheels W for transportation over the field. As is customary in machines of this nature, the header H is adapted to be adjusted either up or down to enable the crop to be cut at the proper height.

In order to avoid confusion when referring to Figs. 1, 3 and 5, header H is indicated as having a left portion "L" and a right portion "R" while facing the machine, the reason being that the left-handed flight of conveyor C is at the left end and the right-handed flight is at the right end of the header H. This has been done notwithstanding the conventional practice of designating right-and-left portions while facing in the direction of travel of the machine.

As shown in Figs. 1 and 2 header H comprises a trough 10 extending the entire length of the header. Trough 10 has a rear wall 11 which forms a continuation of the bottom portion 12. Thus is provided a trough for the conveyance of grain offering no obstruction to free movement of the crop toward a discharge opening 13.

Discharge opening 13 leads to a thresher passageway 14, the latter extending rearwardly to the thresher elements which are conventional and will not be further described.

The sickle S is co-extensive with the forward edge of the header H and is conventional, being actuated in the usual manner by means of a crank-and-pitman arrangement 15, driven in the usual manner.

The reel R extends the length of header H and functions to urge or sweep the grain toward the sickle S and insures that the crop will fall on the trough 10 and then be conveyed to the discharge opening 13. Reel R is supported upon a shaft 16 in suitable journals which are supported on the end walls 17 of header H. A pulley 18 on shaft 16 serves to rotate reel R by means of a belt 19 and the usual drive means not shown. Reel R is provided with the conventional bats 20 supported by spiders 21 radiating from the shaft 16. Spiders 21 are fixed relative to shaft 16 so that the reel turns as a unit with shaft 16. Reel R is arranged so as to be adjustable up or down relative to the sickle S in order to accommodate the machine to the various conditions met in harvesting. The adjusting means is indicated at 22, and will not be further described as it is conventional.

Screw conveyor C is co-extensive with the trough 10 and is journalled in bearings at each end of the trough for rotation therein in the direction shown by the arrow 23 of Figs. 2, 3 and 4. A conventional means of rotating screw conveyor "C" is provided but which is not shown or further described.

Conveyor C is of the type known as an archimedian screw or spiral which serves to convey material presented to it in the direction of the axis of rotation. It is possible, as is done in the present instance, to convey material in two directions along the axis of the conveyor, by simply providing spiral flights, as they are often called, having spirals of opposite "hand" as clearly shown in Figs. 3 and 4. The conveyor C comprises a core 24 of tubing having stub shafts 25 at both ends thereof which are journalled in suitable bearings before mentioned. Shafts 25 are secured in core 24 in any suitable manner. As mentioned before, conveyor C is rotated in the direction of arrow 23 by a pulley fixed to one of the shafts 25, through a suitable belt to the power source.

Referring to Figs. 1, 3 and 4, a left-hand-spiral flight 26 extends from the left end of the core 24 and has a single-lead spiral portion secured to the core by welding or any other suitable means of fastening. Flight 26 is of a left-hand spiral formation and therefore when rotated in the direction of the arrow 23 will move crop material in a rightward direction along the trough 10 toward the discharge opening 13. Likewise a right-hand spiral flight 27 extends from the right end of the core 24 and also has a single-lead spiral portion secured to the core 24 by welding or any other suitable means of fastening. Flight 27 is of a right-handed spiral formation and therefore when rotated in the direction of the arrow 23 will move crop material in a leftward direction along the trough 10 toward the discharge opening 13.

Flights 26 and 27 are initiated at points 28 and 29 respectively preferably lying in a plane common with the axis of core 24 as indicated in Fig. 3. Flight 26 terminates at the left of the medial vertical plane of discharge opening 13 as shown in Figs. 1 and 3 at point 30. A web 31 is welded or otherwise secured to the termination of flight 26 at point 30. Web 31 is disposed in a radial plane and extends rightwardly to the point of intersection with right-hand flight 27, the length of web 31 in this instance being equal to the pitch of screw conveyor C, and the edge 32 of web 31 coincides with the periphery of the conveyor C. However, instances may arise where it may be desirable to make web 31 a multiple or a fraction thereof, of the pitch of the flights 26 or 27, without departing from the spirit of this invention. Web 31 is also secured to core 24 at suitable points to insure rigidity. Web 31 intersects right-hand flight 27 at point 33, and web 31 and flight 27 are secured together by welding or other suitable means. Right-hand flight 27 continues leftwardly to a point 34, which is 180 degrees of rotation beyond point 33, and terminates at a point 34. A second web 35 disposed in a radial plane is secured to right-hand flight 27 at point 34 and extends in a rightward direction to the point of intersection with flight 27 at a point 36. Flight 27 has advanced axially 360 degrees between points 36 and 34. Therefore web 35 in this instance is of a length equal to the pitch of flight 27, and consequently webs 31 and 35 are substantially of equal length.

In this instance a pair of paddles 37 and 38 comprise the advance portion which contacts the crop and conveys it into the discharge opening 13. Referring to Figs. 3 and 4, paddle portions 37 and 38 are substantially co-extensive with webs 31 and 35 respectively with the exception that the ends of paddles 37 and 38 conform necessarily with flights 26 and 27.

As shown in Figs. 3 and 4, paddles 37 and 38 are secured respectively to webs 31 and 35 at the peripheral edges of the webs. Paddles 37 and 38 extend tangentially as shown in Fig. 4 and are secured to core 24, the diameter of the circle of tangency in this instance being no greater than the diameter of the core 24. However, the diameter of the circle of tangency may vary in diameter and may be less than that of the core 24 in order to suit various conditions.

The primary purpose in providing angularly-positioned paddles 37 and 38 is to urge the crop material to slip toward the periphery of the conveyor C thus obviating any tendency for the material to wind around the conveyor and not enter the discharge opening 13. Another purpose in providing angularly-positioned paddles is to bias the crop material downwardly toward the bottom 39 of thresher passage 14 so that it is easily carried backwardly to the threshing mechanism. In this instance webs 31 and 35 serve to stiffen the paddles 37 and 38 against bending should foreign objects be encountered when the machine is in operation.

Figs. 5 and 6 show a modification which may be desirable and satisfactory in many instances. The differences between this modified construction and that shown in Figs. 3 and 4 being that the angularly-positioned paddles 37 and 38 are omitted and the webs 31 and 35 serve as paddles. The construction of the conveyor of Figs. 5 and 6 being otherwise similar to that shown in Figs. 3 and 4, it will not be further described.

Referring to Figs. 1 and 2, discharge opening 13 leads rearwardly to the thresher passage 14 which has a bottom 39 along which the cut crop is conveyed. A raddle type conveyor 40 is positioned in thresher passage 14 and comprises sprockets and chains with cross members 41 whereby the crop is carried rearwardly and upwardly to the thresher mechanism. Conveyor 40 is conventional, is not part of this invention and will not be further described.

Raddle conveyor 40 is positioned so as to rotate in close relation to conveyor C and near enough to bottom 39 to positively move the crop upwardly between the conveyor and the bottom 39. The conveyor 40 moves in the direction of the arrow 42.

As shown in Fig. 2, conveyor 40 protrudes forwardly into the trough 10 a substantial distance and rotates closely adjacent the conveyor C. It is obvious that conveyor 40 will comprise an obstruction to grain moving laterally along rear wall 11 of the trough 10 in the absence of some means of deflecting the crop toward the conveyor C. This is obviated by providing a pair of cone shaped deflectors 41a and 42a secured to the wall 11 of trough 10 as shown in Fig. 1. The large ends of the cone portions 41a and 42a are placed adjacent the conveyor 40 with their apexes extending toward the respective ends of the trough 10. The result of this arrangement being that grain moving from either end of trough 10 will be urged into conveyor C and will not foul the conveyor 40 by entering laterally therein. Portions 41a and 42a aid materially in feeding the grain into the discharge opening 13 in that the grain is conveyed more positively to the paddle portions 37 and 38.

A retarder member 43 is secured over the discharge opening 13 and is co-extensive therewith. Retarder member 43 slopes forwardly and downwardly over the conveyor C as shown in Figs. 1 and 2. The purpose of retarder member 43 is to prevent the crop from being thrown upwardly and forwardly of the trough 10. A resilient strip 44 is secured to the lower edge of the retarder member 43 and makes contact with the periphery of conveyor C and the edge portions of paddle portions 37 and 38. The strip 44 provides a flexible edge for the retarder member and will allow constant contact regardless of any eccentricity of conveyor C.

Considerable trouble has been encountered with screw conveyors in combines, especially when the discharge opening is located near one end of the conveyor. As has been noted above, the crop material conveyed by the long end 26 of the conveyor is of considerable volume and when it reaches the discharge opening 13 the material crowds into the thresher conveyor 40 at the near-side thereof and is instantly gathered rearwardly between the conveyor and the bottom 39, with the result that the far-side of the conveyor is "starved" of crop material, owing to the fact that the short flight 27 is not able to convey enough material to the discharge opening to insure a layer of a uniform depth.

A primary purpose of this invention is to correct this difficulty and it is believed the above described arrangement successfully does so. It will be noticed from the above description that the median line of paddle 37 is located at a point to the right of the medial plane of the discharge opening 13. It has been found by experiment that the best position of the median line of the paddle 37 is to the right with respect to the discharge opening as 17 is to 10, and a length of 13 units for paddle 37 seems satisfactory. These proportions may vary with different conditions but they have been found to give the best results. As conveyor C rotates, paddle 37 tends to free some of the oncoming material from congesting at the right side of opening 13.

Paddle 38 augments the effect of the paddle 37 by urging additional material being moved leftwardly by flight 27 into the right side of opening 13. Thus the combined effects of paddles 37 and 38 serve to deliver a uniformly deep layer of crop material to the conveyor 40.

The above being a complete description of an illustrative embodiment of the invention, what is claimed as new and desired to be secured by Letters Patent of the United States is:

1. A screw conveyor for conveying grain in a harvester provided with a feed trough and a discharge opening, the improvement comprising, a left-hand and a right-hand flight, said left-hand flight having a point of termination at the left of the medial vertical plane of said discharge opening, a first web lying in a radial plane and extending rightwardly from said point of termination to the point of intersection with said right-hand flight at the right of said medial plane, said right-hand flight continuing leftwardly and rotationally from said point of intersection to a point of termination substantially 180 degrees from said first web, a second web lying in a radial plane and extending from said last mentioned point of termination rightwardly to the point of intersection with said right-hand flight, paddle portions substantially co-extensive with said first and second webs and secured to the peripheral edges thereof, said paddle portions extending substantially tangent to said core portion in the direction of rotation of said conveyor and a retarder member secured co-extensively to the upper edge of said discharge opening and extending forwardly to a point adjacent said conveyor, and a resilient member secured to said retarder member and adapted to contact the periphery of said conveyor.

2. A screw conveyor for conveying grain in a harvester provided with a feed trough and a discharge opening, the improvement comprising a core, a left-hand and a right-hand flight, said flights originating on the periphery of said core at substantially identical angular positions, said left-hand flight extending rightwardly and terminating at the left of the medial vertical plane of said discharge opening, a web lying in a radial plane extending from said point of termination rightwardly to the point of intersection with said right-hand flight, said right-hand flight continuing leftwardly and rotationally from said point of intersection to a point of termination substantially 180 degrees from said web, a second web lying in a radial plane extending from said last mentioned point of termination rightwardly to the point of intersection with said right-hand flight, paddle portions substantially co-extensive with said first and second webs and coinciding with the peripheral edges of said webs, said paddle portions extending tangent to a circle of a diameter less than that of said core portion, and in the direction of rotation of said conveyor.

3. In a harvester provided with a transverse feed trough having a discharge opening adjoining one end thereof, in combination, a screw conveyor in said trough having a left-hand and a right-hand flight initiated near the ends of said conveyor, a radial web secured to said conveyor and extending right and left of the medial vertical plane of said discharge opening, said left-hand flight terminating at the left end of said web, the said web terminating at the point of intersection of said right-hand flight and said web, said right-hand flight continuing leftwardly and rotatably to a point of termination substantially 180 degrees from said point of intersection with said web, a second web extending rightwardly from said last mentioned point of termination to a point of intersection with said right-hand flight.

4. In a harvester provided with a transverse feed trough and a discharge opening therein, in combination a transverse conveyor in said trough having a core portion, a left-hand and a right-hand flight secured to said core portion at a common angular position, a radial web secured to said conveyor, said web extending left and right of the medial vertical plane of said discharge opening, said left-hand flight extending rightwardly and terminating at said web, the said right-hand flight extending leftwardly to a point of termination 180 degrees from the intersection of said web and said right-hand flight, and a second radial web secured to said conveyor and extending rightwardly from said last-mentioned point of termination to the point of intersection of said second web with said right-hand flight.

5. In a harvester provided with a transverse feed trough and a discharge opening intermediate the ends of said trough, in combination, a screw conveyor for conveying grain in two directions, to said discharge opening, said conveyor comprising a left-hand and a right-hand flight, said flights starting adjacent the ends of said conveyor at substantially identical angular positions, said left-hand flight terminating at the left of the median vertical line of said discharge opening, a web extending from said point of termination rightwardly to the point of intersection with said right-hand flight, said right-hand flight continuing from said point of intersection leftwardly to a point of termination 180 degrees from said web, a second web extending from said last mentioned point of termination to the point of intersection with said right-hand flight, a retarder member substantially co-extensive with said discharge opening secured to said feed trough and extending forwardly to a point adjacent said conveyor and a resilient member secured to said retarder member and adapted to contact the periphery of said conveyor.

6. In a harvester provided with a transverse feed trough having a discharge opening adjoining one end thereof in combination, a screw conveyor in said trough having a left-hand and a right-hand flight, a radial web secured to said screw conveyor, said web being substantially of a length equal to the pitch of said conveyor and extending left and right of the medial vertical plane of said discharge opening, said left-hand flight extending rightwardly and terminating at the left end of said web, the said right-hand flight extending leftwardly to a point of termination 180 degrees leftwardly from the intersection of said web and said right-hand flight, and a second radial web secured to said conveyor and extending rightwardly from said last-mentioned point of termination to the point of intersection of said second web with said right-hand flight.

7. A screw conveyor for conveying harvested crops, comprising a core portion, a left-hand and a right-hand flight secured to said core portion and initiated at common angular positions thereon, a radial web intermediate the ends of said conveyor of a length substantially equal to the pitch of said screw conveyor, said left-hand flight extending rightwardly and terminating at said web, the said right-hand flight extending leftwardly to a point of termination 180 degrees from the intersection of said web and said right-hand flight, a second radial web extending rightwardly from said last-mentioned point of termination to the point of intersection of said second web with said right-hand flight and paddle portions substantially co-extensive with said first and second webs and coinciding with the peripheral edges thereof, said paddle portions extending tangent to a circle of a diameter not in excess of that of said core portion and in the direction of rotation of said conveyor.

8. A screw conveyor for conveying harvested crops comprising a core portion, a left-hand and a right-hand flight secured to said core portion and initiated at substantially common angular positions thereon, a radial web intermediate the ends of said conveyor of a length substantially equal to the pitch of said screw conveyor, said left-hand flight extending rightwardly and terminating at said web, said right-hand flight extending leftwardly to a point of termination 180 degrees of rotation from the intersection of said web and said right-hand flight, a second radial web extending rightwardly from said last-mentioned point of termination to the point of intersection of said second web with said right-hand flight and paddle portions substantially co-extensive with said webs and extending tangential to a circle of less diameter than that of the said screw conveyor and in the direction of rotation thereof.

9. A screw conveyor for conveying harvested crops comprising a core portion, a left-hand and a right-hand flight on said core portion, a first radial web intermediate the ends of said conveyor, said left-hand flight extending rightwardly and terminating at said web, said right-hand flight extending leftwardly and rotatably to a point of intersection with said first radial web and continuing to a point of termination 180 degrees from the intersection of said web and said right-hand flight, a second radial web extending rightwardly from said last-mentioned point of termination to the point of intersection of said second web with said right-hand flight.

10. In a harvester provided with a transverse feed trough, a discharge opening intermediate the ends of said trough and displaced from the mid-portion thereof so as to divide said trough into long and short sections, in combination a screw conveyor in said trough having a core portion and first and second spirals terminating at first and second paddle portions respectively, said first spiral being a greater length than said second spiral and said spirals being disposed respectively in said long and short sections, said first paddle portion being connected between said first and said second spirals and disposed in front of said discharge opening but displaced from the center thereof in a direction toward said second spiral and said second paddle being also disposed in front of said discharge opening but displaced from the center thereof in a direction toward said second spiral but connected only with said second spiral.

11. In a harvester provided with a transverse feed trough, a discharge opening intermediate the ends of said trough and displaced from the mid-portion thereof so as to divide said trough into long and short sections, in combination a screw conveyor in said trough having a core portion and first and second spirals terminating at first and second paddle portions respectively, said first spiral being of greater length than said second spiral, and said spirals being disposed respectively in said long and short sections, said first paddle portion being connected between said first and second spirals and disposed in front of said discharge opening but displaced from the center thereof in a direction toward said second spiral and said second paddle being also disposed in front of said discharge opening but displaced from the center thereof in a direction toward said second spiral, connected thereto at a position displaced 180° from the position of connection with said second spiral, of said second paddle, and said second spiral continuing about said core in a direction toward said first spiral to another position of connection with said second paddle.

12. A screw conveyor for conveying harvested crops comprising a longitudinally extending core portion, a left-hand and a right-hand flight on said core portion, a first longitudinal web intermediate the ends of said conveyor, said left-hand flight extending rightwardly and terminating at said web, said right-hand flight extending leftwardly and rotatably to a point of intersection with said first web and continuing to a point of termination 180 degrees from the said point of intersection, a second longitudinal web extending rightwardly from the last mentioned point of termination to a point of intersection of said second web with said right-hand flight.

SHERMAN C. HETH.

References Cited in the file of this patent

UNITED STATES PATENTS

| Number | Name | Date |
|---|---|---|
| 1,977,312 | Knapp | Oct. 16, 1934 |
| 2,266,764 | Jordan | Dec. 23, 1941 |
| 2,426,922 | Carroll | Sept. 2, 1947 |
| 2,464,919 | Carroll | Mar. 22, 1949 |
| 2,476,265 | Peterson | July 12, 1949 |
| 2,477,970 | Downing | Aug. 2, 1949 |
| 2,484,981 | Coultas | Oct. 18, 1949 |